United States Patent
Skiles et al.

(10) Patent No.: US 7,223,194 B2
(45) Date of Patent: May 29, 2007

(54) CLUTCH MECHANISM WITH DUAL CLUTCH DEVICES AND A PLANETARY GEARSET

(75) Inventors: Randy Skiles, Hilliard, OH (US); Bobbie Burke, North Lewisburg, OH (US); Michael Dickinson, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 64 days.

(21) Appl. No.: 10/916,854

(22) Filed: Aug. 13, 2004

(65) Prior Publication Data

US 2006/0035743 A1    Feb. 16, 2006

(51) Int. Cl.
*F16H 3/44* (2006.01)

(52) U.S. Cl. ..................................... 475/296

(58) Field of Classification Search ............... 192/3.52; 475/296, 311

See application file for complete search history.

(56) References Cited

U.S. PATENT DOCUMENTS

| | | | |
|---|---|---|---|
| 3,938,631 A | 2/1976 | Smith | |
| 6,491,149 B1 | 12/2002 | Kundermann et al. | |
| 6,849,024 B2 * | 2/2005 | Hayashi et al. | 475/312 |
| 6,893,373 B2 * | 5/2005 | Kawamoto et al. | 475/302 |
| 2002/0086766 A1 | 7/2002 | Hayashi et al. | |
| 2003/0130082 A1 | 7/2003 | Janson | |

\* cited by examiner

*Primary Examiner*—Dirk Wright
(74) *Attorney, Agent, or Firm*—Mark E. Duell, Esq.; Brouse McDowell

(57) ABSTRACT

A clutch mechanism includes a housing adapted to be rotated by an automotive engine, a shaft having first and second sections and a first end adapted to be an input to a transmission, and first and second clutch devices positioned with the housing. The first clutch device, which includes a planetary gear set, can be connected to the first section of the shaft to rotate the shaft. The second clutch device can be connected to the second section of the shaft to rotate the shaft. The planetary gear set provides a gear splitting system for use in doubling the number of gear ratios supplied by the transmission.

45 Claims, 3 Drawing Sheets

CLUTCH MECHANISM WITH DUAL CLUTCH DEVICES AND A PLANETARY GEARSET

I. BACKGROUND OF THE INVENTION

A. Field of the Invention

This invention pertains to apparatuses and methods regarding a clutch mechanism that can replace a torque converter and more specifically to apparatuses and methods regarding a clutch mechanism using a pair of clutches that provides a starting clutch and a gear splitting feature for use in doubling the number of gear ratios supplied by an automatic transmission.

B. Related Background Art

The use of a torque converter between an automotive engine and an automatic transmission is well known in the art. Torque converters are fluid couplings that permit the engine drive shaft to rotate somewhat independently of the automatic transmission. As a result, torque converters permit the automobile to start motion and also to come to a complete stop without stalling the engine. Torque converters thus work well for their intended purpose.

Torque converters, however, have disadvantages. One disadvantage is that torque converters are known to be relatively inefficient. In particular, torque converters generally provide relatively poor fuel economy—although this can be improved with the addition of a lockup clutch. The lockup clutch locks the torque converter turbine to the torque converter pump when the rotational speed is sufficiently high thereby eliminating slippage and improving efficiency.

It is known to provide dual clutch systems in place of torque converters in order to minimize these disadvantages. U.S. Pat. No. 3,938,631 to Smith provides a gearing system with speed responsive starting clutches. This gearing system is used to eliminate the conventional fluid drive unit in a transmission drive arrangement having input clutches for connecting the fluid drive unit to automatic shifting planetary gearing. A torque converter is eliminated from the drive arrangement, and the existing input clutches of the drive arrangement are used as starting clutches. However, Smith does not provide a gear splitting feature for use in doubling the number of gear ratios supplied by the transmission.

U.S. Pat. No. 6,491,149 to Kundermann et al. provides a double clutch apparatus positioned in a drive train of a motor vehicle between a drive unit and a transmission. The double clutch apparatus has a first clutch associated with a first transmission input shaft and a second clutch associated with a second transmission input shaft. Both transmission input shafts are used to transmit torque between the drive unit and the transmission. However, Kundermann does not provide a gear splitting feature for use in doubling the number of gear ratios supplied by the transmission.

U.S. Patent Application Pub. No. US 2002/0086766 to Hayashi et al. provides a starting clutch usable in place of torque converter in an automatic transmission. The starting clutch includes wet first and second clutches, a planetary gear, and a damper. However, Hayashi et al. does not provide a single transmission input shaft separately rotatable by either clutch independently.

U.S. Patent Application Pub. No. US 2003/0130082 to Janson provides two clutches, preferably wet friction clutches, to allow an automatic transmission driven vehicle to start up from a stop and remain stopped while in gear without a torque converter. However, Janson does not provide a single transmission input shaft separately rotatable by either clutch independently.

Aside from the torque converter issues just discussed, there is a general push in the automotive industry for an increase in the number of gear ratios available from the transmission. Often three to five forward gears are no longer considered sufficient because there is an increasing desire for six to eight forward gears. One solution is to design and build larger and more complex transmissions. However, this solution has the disadvantage of adding undesirable weight and cost to the manufacture of a transmission.

What is needed is a clutch mechanism using a pair of clutches that serves as a starting clutch and that provides a gear splitting feature for use in doubling the number of gear ratios supplied by the automatic transmission. In this way the disadvantages known in the art can be overcome in a way that is better, more efficient and that provides better overall results.

II. SUMMARY OF THE INVENTION

This invention provides a clutch mechanism that replaces a torque converter. The clutch mechanism includes a housing adapted to be rotated by an engine, a shaft having a first end that extends from the housing and serves as a transmission input shaft, and a gear splitting system for use in doubling the number of gear ratios supplied by the transmission. In the preferred embodiment, the clutch mechanism includes a first wet clutch that has a planetary gear set to provide the gear splitting system for use in starting the automobile from a stop condition, and a second wet clutch to provide direct power flow from the engine to the transmission.

This invention also provides a method of doubling the number of gear ratios supplied by a transmission. This method includes the steps of (1) providing an automobile engine and an automatic automobile transmission; (2) providing a clutch mechanism that includes a housing rotatably connected to the engine, a shaft having first and second sections and a first end that extends from the housing and defines an input to the transmission, a first clutch device, including a planetary gear set, that is selectively rotatably connectable to the first section of the shaft, and a second clutch device that is selectively rotatably connectable to the second section of the shaft; (3) engaging the first clutch device and providing a first number of gear ratios; (4) disengaging the first clutch device; and, (5) engaging the second clutch device and providing a second number of gear ratios.

Accordingly, one object of this invention is to provide a clutch mechanism that can replace a torque converter in use with an automotive automatic transmission.

Another object of this invention is to provide a clutch mechanism that can be used both for starting and also to double the number of effective gear ratios in the transmission.

Still another object of this invention is to provide the features just noted using first and second clutch devices that can each be used separately to rotate a single shaft used as the transmission input shaft.

One advantage of this invention is that by replacing the conventional torque converter with the inventive clutch mechanism automatic transmission inefficiency is greatly improved.

Another advantage of this invention is that the number of effective gear ratios available in the transmission can be doubled.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DESCRIPTION OF THE PREFERRED EMBODIMENT

Figure 1:
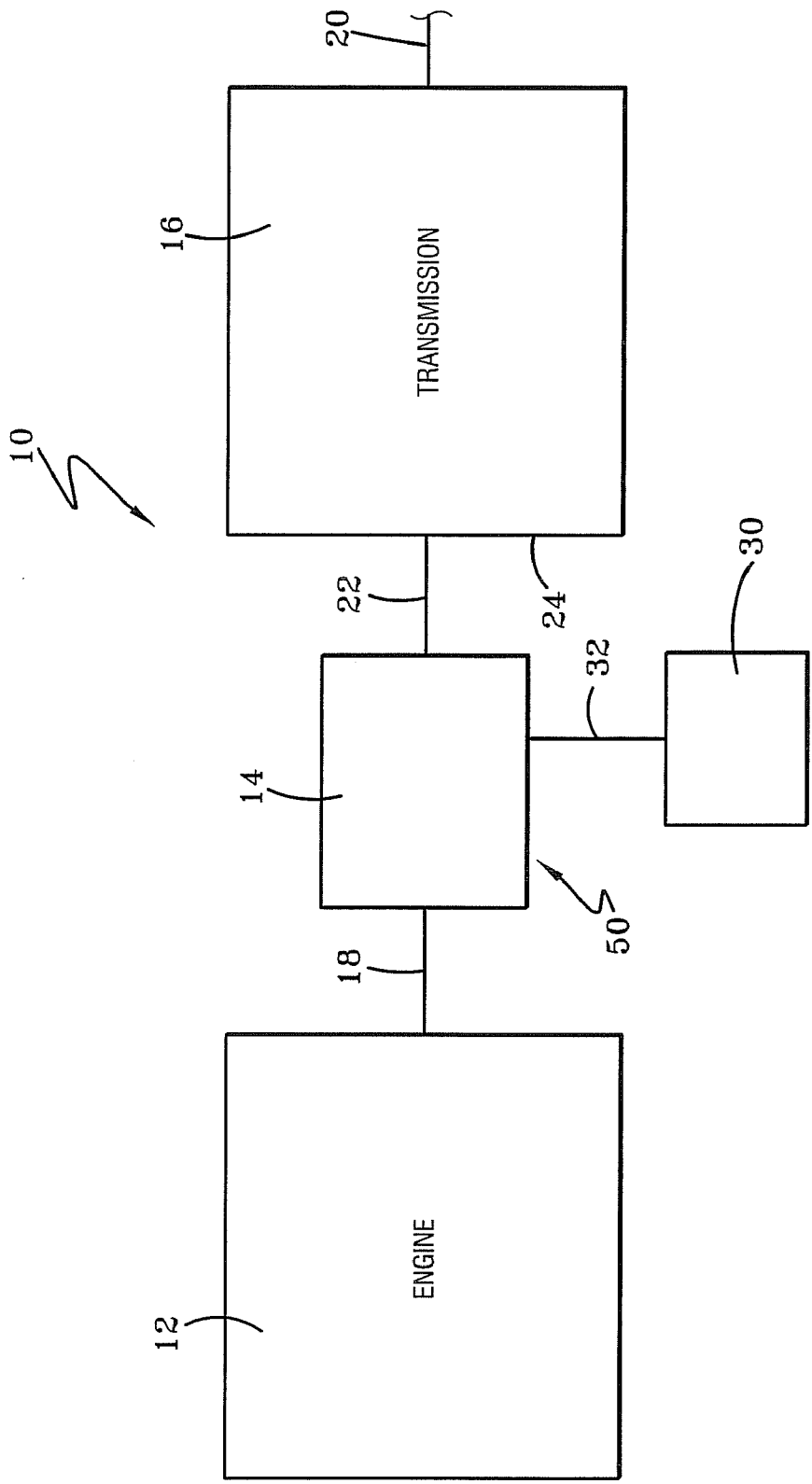
FIG. 1 is a schematic representation showing some of the primary components of an automobile drive system.

Referring now to the drawings wherein the showings are for purposes of illustrating a preferred embodiment of the invention only and not for purposes of limiting the same, FIG. 1 illustrates some of the primary components of a drive system 10 for use with a vehicle such as an automobile. In particular, FIG. 1 shows an engine 12, a conversion device 14 and a transmission 16. As is well known in the art, the transmission 16 permits the engine 12 to operate in a relatively narrow speed range while providing a wide range of output speeds. The transmission 16 includes a plurality of gears (not shown) in order to make effective use of the engine's 12 torque and provide a number of gear ratios for use in driving (providing locomotion to) the automobile. The engine 12 drives (rotates) a drive shaft 18 in order to provide torque for the transmission 16. The transmission has an output, transmission output shaft 20, that is used to transfer torque from the transmission 16 to the automobiles drive wheels (not shown).

With continuing reference to FIG. 1, this invention is primarily focused on the components between the drive shaft 18 and the transmission 16 and is primarily intended for use with an automatic transmission 16. It is typical for a conversion device 14 to be provided between the engine 12 and the automatic transmission 16 to provide an appropriate transmission input, via transmission input shaft 22. As is commonly known in the art, the conversion device 14 may be a torque converter. While a torque converter works well for its intended purpose, it has the disadvantages and limitations discussed above. Thus, the present inventors have devised a clutch mechanism 50 to replace the standard torque converter and serve the function of the conversion device 14. In particular, the clutch mechanism 50 of this invention will be used in starting the motion of the automobile and also to double the number of effective gear ratios in the transmission 16.

Figure 2:
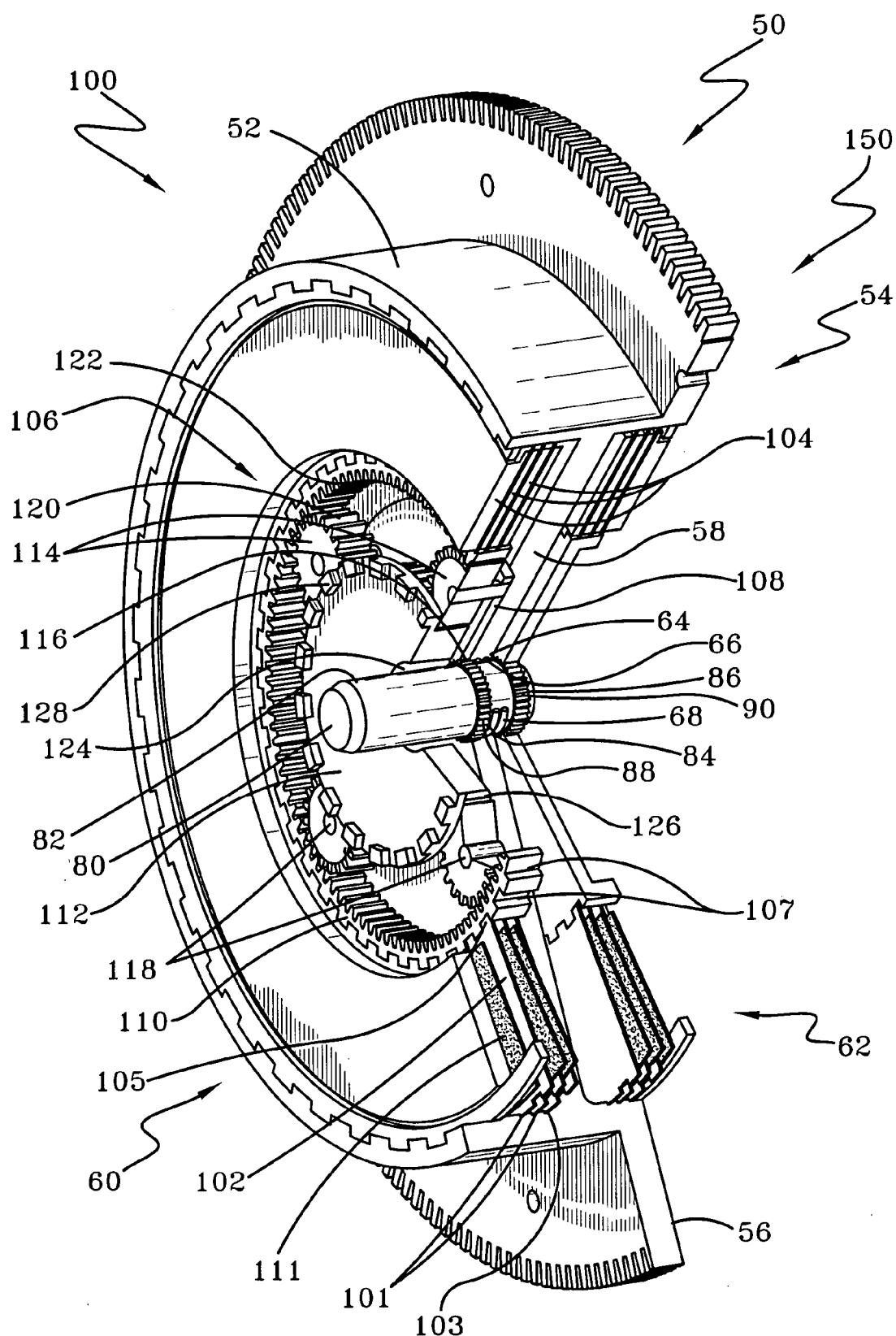
FIG. 2 is a perspective view, shown in partial cutaway, of a first end of the clutch mechanism of this invention with the first clutch device most clearly seen.
Figure 3:
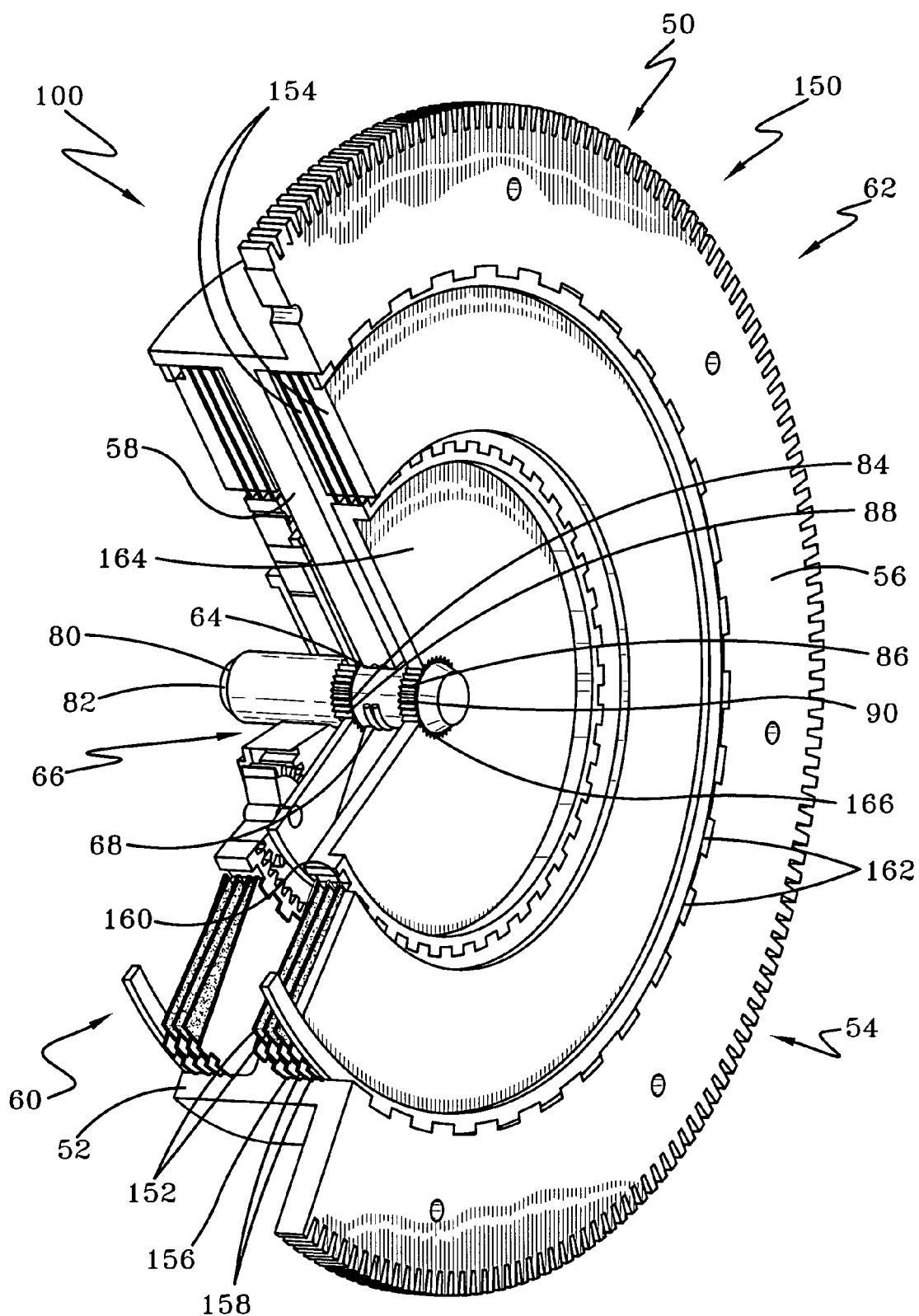
FIG. 3 is a perspective view, shown in partial cutaway, of a second end of the clutch mechanism of this invention with the second clutch device most clearly seen.

With reference now to FIGS. 1–3, the clutch mechanism 50 includes first and second clutch devices 100, 150 positioned within a housing 52. The housing 52 includes engine connecting means 54 for use in connecting the housing 52 to the drive shaft 18. In the preferred embodiment, the engine connecting means 54 is a flange 56 adapted to be connected to a flywheel (not shown) that is connected to the drive shaft 18 in a manner well known in the art. Preferably, the housing 52 includes a wall 58 that defines first and second housing zones 60, 62. The wall 58 includes an opening 64 to receive a shaft 80 that can rotate relative to the housing 52. Sealing means 66 is provided between the shaft 80 and the wall 58 to maintain a fluid seal between the first and second housing zones 60, 62. In the preferred embodiment, the sealing means 66 is a pair of O-rings 68, shown, but it should be understood that any sealing means chosen with sound engineering judgment will work with this invention. The shaft 80 includes a first end 82 that extends from the housing 52 and is adapted to be used as the transmission input shaft 22. The shaft 80 also includes a first section 84 that is selectively rotatably connectable to the first clutch device 100 and a second section 86 that is selectively rotatably connectable to the second clutch device 150. Preferably, the first and second sections 84, 86 include first and second splines 88, 90 respectively, as shown, so that rotation of the proper component of the first clutch device 100 will rotate the shaft 80 from the first section 84 and, alternatively, rotation of the proper component of the second clutch device 150 will rotate the shaft 80 from the second section 86.

Referring now to FIGS. 1–2, the first clutch device 100, when engaged, connects the housing 52 to the first section 84 of the shaft 80. The first clutch device 100 includes at least a first clutch plate 102, preferably multiple clutch plates 102, that is selectively engageable into a frictional relationship with at least a first housing plate 104, preferably multiple housing plates 104 that correspond to the number of clutch plates 102. Friction pads 111 may be affixed to either the clutch plates 102 or the housing plates 104 to improve frictional contact. The operation of the interaction between clutch plates (as with clutch plates 102 and housing plates 104) is well known in the art and thus a detailed description will not be provided. In the preferred embodiment, the housing plates 104 have a radial outer surface with a plurality of tabs 101 that are received within grooves 103 formed on the inner surface of the first housing zone 60 of the housing 52, as shown. This arrangement prevents the housing plates 104 from moving axially.

With continuing reference to FIGS. 1–2, the first clutch device 100 also includes a planetary gear set 106 for use in doubling the number of gear ratios supplied by the automatic transmission 16. While the planetary gear set used with this invention can be of any type chosen with sound engineering judgment, the preferred planetary gear set 106 includes a planetary carrier 108, a ring gear 110, a sun gear 112 and at least a first planetary gear 114 (four planetary gears 114 shown and preferred). The clutch plates 102 preferably have a radial inner surface with a plurality of tabs 105 that are slidingly received within grooves 107 formed on the radial outer surface of the ring gear 110, as shown. This arrangement permits the clutch plates 102 to slide axially (along the length of the shaft 80) with respect to the ring gear 110 but also provides a rotatable connection so that rotation of the clutch plates 102 will cause rotation of the ring gear 110. The planetary carrier 108 preferably has a radial inner surface with a spline 116 adapted to be rotatably received by the first spline 88 of the first section 84 of the shaft 80. This arrangement provides a rotatable connection so that rotation of the planetary carrier 108 will cause rotation of the shaft 80. Each planetary gear 114 rotates around a pin 118 that is received by the planetary carrier 108. Each planetary gear 114 also has a plurality of gear teeth 120 that mesh with teeth 122 on the radial inner surface of the ring gear 110. This arrangement provides a rotatable connection so that rotation of the ring gear 110 will cause rotation of the planetary gears 114 about pins 118. The preferred sun gear 112 has a radial inner surface defining an opening 124 that receives the shaft 80. The shaft 80 can rotate freely within the opening 124. The sun gear 112 also has a radial outer surface with teeth 126 that mesh with the teeth 120 on the planetary gears 114. In the preferred embodiment, the sun gear 112 does not rotate with respect to a housing 24 of the transmission 16. Most preferably, this non-rotation of the sun gear 112 relative to the transmission 16 is accomplished using a splined surface 128 on the sun gear 112 that engages with a corresponding splined surface of the transmission housing 24.

Still referring to FIGS. 1–2, the planetary gear set 106 operates as follows. When the clutch plates 102 are frictionally engaged to the housing plates 104, rotation of the housing 52 causes rotation of the ring gear 110. Rotation of the ring gear 110 causes the planetary gears 114 to rotate about pins 118 and also causes the planetary gears 114 to rotate about the teeth 126 on the outer surface of the sun gear 112. This motion causes the planetary carrier 108 to rotate thus causing the shaft 80 to rotate. In the preferred embodiment, operation of the first clutch device 100 with the planetary gear set 106 rotates the shaft 80 at a speed that is slower than the speed that the second clutch device 150 rotates the shaft 80. In this way, the total number of effective gear ratios in the transmission 16 may be doubled. In an alternate embodiment, the planetary gear seat 106 could be constructed to rotate the shaft 80 at a speed that is faster than the speed that the second clutch device 150 rotates the shaft 80. This embodiment could also double the total number of effective gear ratios in the transmission 16.

With reference now to FIGS. 1 and 3, the second clutch device 150, when engaged, connects the housing 52 to the second section 86 of the shaft 80. The second clutch device 150 includes at least a first clutch plate 152, preferably multiple clutch plates 152, that is selectively engageable into a frictional relationship with at least a first housing plate 154, preferably multiple housing plates 154, that correspond to the number of clutch plates 152. In the preferred embodiment, the housing plates 154 have a radial outer surface with a plurality of tabs 156 that are received within grooves 158 formed on the inner surface of the second housing zone 62 of the housing 52, as shown. This arrangement prevents the housing plates 154 from moving axially. The clutch plates 152 preferably have a radial inner surface with a plurality of tabs 160 that are slidingly received within grooves 162 formed on the radial outer surface of a hub 164, as shown. This arrangement permits the clutch plates 152 to slide axially with respect to the hub 164 but also provides a rotatable connection so that rotation of the clutch plates 152 will cause rotation of the hub 164. The hub 164 preferably has a radial inner surface with a spline 166 adapted to be rotatably received by the second spline 90 of the second section 86 of the shaft 80. This arrangement provides a rotatable connection so that rotation of the hub 164 will cause rotation of the shaft 80.

With reference to FIGS. 1–3, in the preferred embodiment the first and second clutch devices 100, 150 are of the type known as wet clutches. This means that a fluid, preferably hydraulic fluid, is used to operate or engage the clutch devices 100, 150. Thus, a hydraulic system 30 is provided to supply hydraulic fluid via hydraulic lines 32 to the clutch mechanism 50. The specific hydraulic system 30, including controls, used with this invention can be of any type chosen with sound engineering judgment and will not be discussed in detail. However, it should be noted that in the preferred embodiment the first and second clutch devices 100, 150 are not operated simultaneously. In particular, there are three general operational conditions: (1) First condition: neither of the clutch devices 100, 150 are engaged; (2) Second condition: the first clutch device 100 is engaged, partially or fully, while the second clutch device 150 is not engaged; and (3) Third condition: the second clutch device 150 is engaged, partially or fully, while the first clutch device 100 is not engaged. The first condition occurs, for example, when the automobile is not being operated or when the automobile transmission is in neutral (that is, it is desired to have no motion either forward or reverse). In this condition torque from the engine 12 is not transferred to the transmission 16. More specifically, in the first condition the shaft 80 is not rotated. The third condition occurs, for example, when the automobile is just beginning to start motion or when the number of speeds provided by the transmission 16 is sufficient for operation of the automobile. The second condition occurs when it is desirable to double the number of effective gear ratios in the transmission 16. This has the effect of turning a three speed transmission into a six gear transmission or turning a four speed transmission into an eight speed transmission. This doubling of effective gear ratios occurs because the speed of the shaft 80, as the transmission input shaft 22, is faster [twice the speed] when the clutch mechanism 50 is in the second condition than [that] it is when the clutch mechanism 50 is in the third condition.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

We claim:

1. A clutch mechanism comprising:
    a housing adapted to be rotated by an associated engine;
    a shaft having first and second sections and a first end that extends from the housing, the first end adapted to be the only transmission input drive shaft for an associated transmission;
    a first clutch device positioned within the housing, the first clutch device being selectively rotatably connectable to the first section of the shaft, the first clutch device including a planetary gear set; and,
    a second clutch device positioned within the housing, the second clutch device being selectively rotatably connectable to the second section of the shaft.

2. The clutch mechanism of claim 1 wherein the first and second clutch devices comprise first and second wet clutches respectively.

3. The clutch mechanism of claim 1 wherein the planetary gear set comprises:
    a planetary carrier that is rotatably connected to the first section of the shaft;
    a ring gear that is selectively rotatably connected to at least a first clutch plate of the first clutch device;
    a sun gear; and,
    a plurality of planetary gears that are rotatably connected to the ring gear, the sun gear, and the planetary carrier.

4. The clutch mechanism of claim 1 wherein the first and second clutch devices provides gear splitting means for use in doubling the number of gear ratios supplied by the associated transmission.

5. The clutch mechanism of claim 1 wherein the housing comprises a flange adapted to be connected to a flywheel for rotation thereby.

6. The clutch mechanism of claim 1 wherein the first clutch device, when engaged, connects the housing to the first section of the shaft.

7. The clutch mechanism of claim 1 wherein the second clutch device, when engaged, connects the housing to the second section of the shaft.

8. A clutch mechanism comprising:
   a housing adapted to be rotated by an associated engine, wherein the housing comprises a wall defining first and second housing zones;
   a shaft having first and second sections and a first end that extends from the housing, the first end adapted to be an input to an associated transmission;
   a first clutch device positioned within the housing, the first clutch device being selectively rotatably connectable to the first section of the shaft, the first clutch device including a planetary gear set, the first clutch device and the first section of the shaft being positioned substantially within the first housing zone;
   a second clutch device positioned within the housing, the second clutch device being selectively rotatably connectable to the second section of the shaft, the second clutch device and the second section of the shaft being positioned substantially within the second housing zone; and,
   wherein the first and second clutch devices comprise first and second wet clutches respectively.

9. The clutch mechanism of claim 8 wherein the clutch wall is substantially perpendicular to the axis of the shaft.

10. The clutch mechanism of claim 8 wherein the housing comprises a flange adapted to be connected to a flywheel for rotation thereby.

11. The clutch mechanism of claim 8 wherein the wall has an opening that receives the shaft.

12. The clutch mechanism of claim 8 wherein the first clutch device, when engaged, connects the housing to the first section of the shaft.

13. The clutch mechanism of claim 8 wherein the second clutch device, when engaged, connects the housing to the second section of the shaft.

14. A clutch mechanism comprising:
   a housing adapted to be rotated by an associated engine;
   a shaft having first and second sections and a first end that extends from the housing, the first end adapted to be an input to an associated transmission;
   a first clutch device positioned within the housing, the first clutch device being selectively rotatably connectable to the first section of the shaft, the first clutch device including a planetary gear set comprising: (a) a planetary carrier that is rotatably connected to the first section of the shaft; (b) a ring gear that is selectively rotatably connected to at least a first clutch plate of the first clutch device; (c) a sun gear that does not rotate with respect to a housing of the associated transmission; and, a plurality of planetary gears that are rotatably connected to the ring gear, the sun gear, and the planetary carrier; and,
   a second clutch device positioned within the housing, the second clutch device being selectively rotatably connectable to the second section of the shaft.

15. The clutch mechanism of claim 14 where the planetary carrier is splined to the first section of the shaft and the sun gear is adapted to be splined to the housing of the associated transmission.

16. The clutch mechanism of claim 14 wherein the housing comprises a flange adapted to be connected to a flywheel for rotation thereby.

17. The clutch mechanism of claim 14 wherein the first clutch device, when engaged, connects the housing to the first section of the shaft.

18. The clutch mechanism of claim 14 wherein the second clutch device, when engaged, connects the housing to the second section of the shaft.

19. A clutch mechanism comprising:
   a housing adapted to be rotated by an associated engine;
   a shaft having first and second sections and a first end that extends from the housing, the first end adapted to be an input to an associated transmission;
   a first clutch device positioned within the housing, the first clutch device being selectively rotatably connectable to the first section of the shaft, the first clutch device including a planetary gear set that comprises a planetary carrier that is splined to the first section of the shaft; and,
   a second clutch device positioned within the housing, the second clutch device being selectively rotatably connectable to the second section of the shaft, wherein the second clutch device comprises a hub that is splined to the second section of the shaft.

20. The clutch mechanism of claim 19 wherein the housing comprises a flange adapted to be connected to a flywheel for rotation thereby.

21. The clutch mechanism of claim 19 wherein the first clutch device, when engaged, connects the housing to the first section of the shaft.

22. The clutch mechanism of claim 19 wherein the second clutch device, when engaged, connects the housing to the second section of the shaft.

23. A clutch mechanism comprising:
   a housing adapted to be rotated by an associated engine;
   a shaft having a first end that extends from the housing, the first end adapted to be the only transmission input drive shaft for an associated transmission; and,
   gear splitting means for use in doubling the number of gear ratios supplied by the associated transmission.

24. The clutch mechanism of claim 23 wherein the gear splitting means comprises:
   a first clutch device positioned within the housing, the first clutch device selectively rotatably connectable to the first section of the shaft, the first clutch device comprising a first wet clutch and including a planetary gear set; and,
   a second clutch device positioned within the housing, the second clutch device selectively rotatably connectable to the second section of the shaft, the second clutch device comprising a second wet clutch.

25. The clutch mechanism of claim 24 wherein the first clutch device, when engaged, connects the housing to the first section of the shaft.

26. The clutch mechanism of claim 24 wherein the second clutch device, when engaged, connects the housing to the second section of the shaft.

27. The clutch mechanism of claim 23 wherein the housing comprises a flange adapted to be connected to a flywheel for rotation thereby.

28. A clutch mechanism comprising:
   a housing adapted to be rotated by an associated engine, wherein the housing comprises a clutch wall defining first and second housing zones;

a shaft having a first end that extends from the housing, the first end adapted to be an input to an associated transmission; and, gear splitting means for use in doubling the number of gear ratios supplied by the associated transmission, wherein the gear splitting means comprises:

(a) a first clutch selectively rotatably connectable to the first section of the shaft, the first clutch device comprising a first wet clutch and including a planetary gear set, the first clutch device and the first section of the shaft being positioned substantially within the first housing zone; and, (b) a second clutch device selectively rotatably connectable to the second section of the shaft, the second clutch device comprising a second wet clutch, the second clutch device and the second section of the shaft being positioned substantially within the second housing zone.

29. The clutch mechanism of claim 28 wherein the planetary gear set comprises:

a planetary carrier that is rotatably connected to the first section of the shaft;

a ring gear that is selectively rotatably connected to the first wet clutch;

a sun gear that does not rotate with respect to a housing of the associated transmission; and, a plurality of planetary gears that are rotatably connected to the ring gear, the sun gear, and the planetary carrier.

30. The clutch mechanism of claim 29 wherein the planetary carrier is splined to the first section of the shaft and wherein the second clutch device comprises a hub that is splined to the second section of the shaft.

31. The clutch mechanism of claim 28 wherein the housing comprises a flange adapted to be connected to a flywheel for rotation thereby.

32. The clutch mechanism of claim 28 wherein the wall has an opening that receives the shaft.

33. The clutch mechanism of claim 28 wherein the first clutch device, when engaged, connects the housing to the first section of the shaft.

34. The clutch mechanism of claim 28 wherein the second clutch device, when engaged, connects the housing to the second section of the shaft.

35. A method of doubling the number of gear ratios supplied by a transmission, comprising the steps of:

providing an automobile engine;

providing an automatic automobile transmission that only receives one transmission input drive shaft;

providing a clutch mechanism comprising: a housing rotatably connected to the engine, a shaft having first and second sections and a first end that extends from the housing and defines the transmission input drive shaft, a first clutch device, including a planetary gear set, that is selectively rotatably connectable to the first section of the shaft, and a second clutch device that is selectively rotatably connectable to the second section of the shaft;

engaging the first clutch device and providing a first number of gear ratios;

disengaging the first clutch device; and, engaging the second clutch device and providing a second number of gear ratios.

36. The method of claim 35 further comprising the steps of:

providing the first clutch device with a first clutch plate;

providing the planetary gear set with a planetary carrier, a ring gear, a sun gear, and a plurality of planetary gears that are rotatably connected to the ring gear, the sun gear, and the planetary carrier;

wherein the step of engaging the first clutch device and providing a first number of gear ratios, comprises the steps:

engaging the first clutch plate;

rotatably connecting the first clutch to the ring gear; and, rotatably connecting the planetary carrier to the first section of the shaft.

37. The method of claim 35 wherein the step of, engaging the first clutch device and providing a first number of gear ratios, comprises the step of:

connecting the housing to the first section of the shaft.

38. The method of claim 35 wherein the step of, engaging the second clutch device and providing a second number of gear ratios, comprises the step of:

connecting the housing to the second section of the shaft.

39. A method of doubling the number of gear ratios supplied by a transmission, comprising the steps of:

providing an automobile engine and an automatic automobile transmission;

providing a clutch mechanism comprising:

(a) a housing rotatably connected to the engine;

(b) a shaft having first and second sections and a first end that extends from the housing and defines an input to the transmission;

(c) a first clutch device having a first clutch plate and a planetary gear set that is selectively rotatably connectable to the first section of the shaft, the planetary gear set comprising: a planetary carrier, a ring gear, a sun gear, and a plurality of planetary gears that are rotatably connected to the ring gear, the sun gear, and the planetary carrier; and, (d) a second clutch device that is selectively rotatably connectable to the second section of the shaft;

engaging the first clutch device and providing a first number of gear ratios, this step comprising the steps of:

(a) engaging the first clutch plate;

(b) rotatably connecting the first clutch to the ring gear; and, (c) rotatably connecting the planetary carrier to the first section of the shaft; and, (d) preventing the sun gear from rotating with respect to a housing of the transmission; and, disengaging the first clutch device; and, engaging the second clutch device and providing a second number of gear ratios.

40. The method of claim 39 further comprising the steps of:

providing the second clutch device with a second clutch plate and a hub;

wherein the step of engaging the second clutch device and providing a second number of gear ratios comprises the steps of:

engaging the second clutch plate; and, rotatably connecting the hub to the second section of the shaft.

41. A clutch mechanism comprising:

a housing adapted to be rotated by an associated engine, wherein the housing comprises a wall defining first and second housing zones;

a shaft having first and second sections and a first end that extends from the housing, the first end adapted to be an input to an associated transmission;

a first clutch device positioned within the housing, the first clutch device being selectively rotatably connectable to the first section of the shaft, the first clutch device including a planetary gear set, the first clutch device and the first section of the shaft being positioned substantially within the first housing zone; and, a second clutch device positioned within the housing, the second clutch device being selectively rotatably connectable to the second section of the shaft, the second clutch device and the second section of the shaft being positioned substantially within the second housing zone.

42. The clutch mechanism of claim 41 wherein the housing comprises a flange adapted to be connected to a flywheel for rotation thereby.

43. The clutch mechanism of claim 41 wherein the wall has an opening that receives the shaft.

44. The clutch mechanism of claim 41 wherein the first clutch device, when engaged, connects the housing to the first section of the shaft.

45. The clutch mechanism of claim 41 wherein the second clutch device, when engaged, connects the housing to the second section of the shaft.

* * * * *